(12) United States Patent
Doi et al.

(10) Patent No.: US 12,240,558 B2
(45) Date of Patent: Mar. 4, 2025

(54) FRONT STRUCTURE OF HANDLEBAR VEHICLE

(71) Applicant: Hitachi Astemo, Ltd., Hitachinaka (JP)

(72) Inventors: Tomohiro Doi, Hitachinaka (JP); Hiroaki Watanabe, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/267,812

(22) PCT Filed: Dec. 13, 2021

(86) PCT No.: PCT/JP2021/045814
§ 371 (c)(1),
(2) Date: Jun. 16, 2023

(87) PCT Pub. No.: WO2022/138283
PCT Pub. Date: Jun. 30, 2022

(65) Prior Publication Data
US 2024/0043089 A1     Feb. 8, 2024

(30) Foreign Application Priority Data
Dec. 22, 2020     (JP) ................................. 2020-212729

(51) Int. Cl.
*B62K 23/06*     (2006.01)
*B62L 3/02*     (2006.01)

(52) U.S. Cl.
CPC .............. *B62K 23/06* (2013.01); *B62L 3/023* (2013.01)

(58) Field of Classification Search
CPC ................................ B62K 23/06; B62L 3/023
See application file for complete search history.

(56) References Cited

U.S. PATENT DOCUMENTS

| 5,678,665 A | * | 10/1997 | Debreczeni | ............. | B62L 3/023 |
| | | | | | 188/344 |
| 7,621,380 B2 | * | 11/2009 | Wolfe | ....................... | B62L 3/02 |
| | | | | | 303/137 |
| 11,383,687 B2 | * | 7/2022 | Perry | ...................... | B60T 11/22 |

FOREIGN PATENT DOCUMENTS

| JP | S60115197 U | * | 8/1985 | ................ B62L 3/02 |
| JP | 2001-18876 A |   | 1/2001 | |

(Continued)

OTHER PUBLICATIONS

Machine translation of JP S 60115197 U obtained from fit database (Year: 1985).*

(Continued)

*Primary Examiner* — Thomas C Diaz
(74) *Attorney, Agent, or Firm* — WHDA, LLP

(57) ABSTRACT

There is provided a front structure of a handlebar vehicle that allows clutch and brake operations to be easily performed with one hand of the rider, a clutch lever that activates a clutch device and a brake lever of a brake device that activates a rear-wheel brake being arranged around a grip provided at a side-end part of a steering handlebar. The brake device is provided with a hydraulic master cylinder provided with a cylinder hole that accommodates a piston, and a brake lever that activates the piston. A clutch grip operation part of the clutch lever and a brake grip operation part of the brake lever extend along the grip and are able to rotate in the same rotation direction, and the clutch lever is disposed higher in the body of the vehicle than the brake lever.

4 Claims, 6 Drawing Sheets

(56) References Cited

FOREIGN PATENT DOCUMENTS

JP           3422518 B2     6/2003
JP           3561392 B2     9/2004

OTHER PUBLICATIONS

Brembo 13mmm Billet rear thumb brake master cylinder, 2015, https://www.sportbiketrackgear.com/brembo-13mm-billet-rear-thumb-brake-master-cylinder/ (Year: 2015).*
International Search Report dated Mar. 1, 2022, issued in counterpart International Application No. PCT/JP2021/045814. (2 pages).
"High Performance 2013", Jul. 22, 2015, https://issuu.com/semcdistribution/docs/catalogue_hpk_2014/95, [online], [retrieval date Feb. 14, 2022 (Feb. 14, 2022)], pp. 93. (1 page).

* cited by examiner

FRONT STRUCTURE OF HANDLEBAR VEHICLE

TECHNICAL FIELD

The present invention relates to a front structure of a handlebar vehicle such as a motorcycle, and more particularly to a front structure of a handlebar vehicle including a clutch lever and a brake lever in front of a steering handlebar in a vehicle body.

BACKGROUND ART

In the related art, as a front structure of a handlebar vehicle, there is a structure in which a clutch lever for activating a clutch device is provided in the vicinity of a handlebar, and a brake operating member for braking a rear wheel is provided in the vicinity of the clutch lever (for example, see PTLS 1 and 2).

CITATION LIST

Patent Literature

PTL 1: JP3561392B
PTL 2: JP3422518B

SUMMARY OF INVENTION

Technical Problem

In the above-described PTLS 1 and 2, a rider can operate the clutch lever and the brake lever by an operation with a left hand, and the operation is performed by pressing the brake lever with a thumb of the left hand on a grip of the handlebar during a brake operation, and by gripping the clutch lever with a finger other than the thumb of the left hand, such as an index finger and a middle finger, during a clutch operation. However, the brake lever needs to be pressed by the thumb while gripping the grip, and thus the brake operation is not easily performed.

Therefore, an object of the invention is to provide a front structure of a handlebar vehicle in which a clutch operation and a brake operation can be easily performed with one hand of a rider.

Solution to Problem

In order to achieve the above object, the invention provides a front structure of a handlebar vehicle in which a clutch lever configured to activate a clutch device configured to connect and disconnect a driving force transmission path to and from a wheel, and a brake lever of a brake device configured to activate a rear-wheel brake are disposed around a grip provided at a side-end part of a steering handlebar. The brake device includes a hydraulic master cylinder having a cylinder hole for accommodating a piston and the brake lever configured to activate the piston, the clutch lever and the brake lever extend along the grip in front of the grip in a body of the vehicle and are pivotable in the same rotation direction, and the clutch lever is disposed higher in the body of the vehicle than the brake lever.

Preferably, the hydraulic master cylinder is attached such that a central axis of the cylinder hole is parallel to a central axis of the handlebar.

Further, it is preferable that the hydraulic master cylinder is attached such that an inclination angle of the central axis of the cylinder hole with respect to the central axis of the handlebar is adjustable.

Preferably, the brake device is attached to the handlebar via a master cylinder attachment bracket, the master cylinder attachment bracket includes a handlebar attachment portion attached to the handlebar and a master cylinder attachment portion extending downwardly of the body of the vehicle from the handlebar attachment portion, and the hydraulic master cylinder is attached to the master cylinder attachment portion.

Further, it is preferable that the hydraulic master cylinder includes a vehicle body attachment bracket attached to the master cylinder attachment bracket and elongated in an inner and outer direction of the body of the vehicle, the vehicle body attachment bracket is formed with a circular first bolt insertion hole on an inner side of the body of the vehicle and a second bolt insertion hole formed as an arc-shaped long hole elongated in an upper-lower direction of the body of the vehicle around the first bolt insertion hole on an outer side of the body of the vehicle, and the hydraulic master cylinder is attached to the master cylinder attachment bracket by fastening an attachment bolt inserted into the first bolt insertion hole and an attachment bolt inserted into any position in the second bolt insertion hole to the master cylinder attachment bracket.

Advantageous Effects of Invention

According to the invention, the clutch lever and the brake lever extend along the grip in front of the grip in the body of the vehicle and are pivotable in the same rotation direction, the clutch lever is further disposed higher in the body of the vehicle than the brake lever. Therefore, the rider can easily perform the clutch operation or the brake operation by gripping the clutch lever or the brake lever with a finger other than the thumb of the left hand while gripping the grip.

The hydraulic master cylinder is attached such that the central axis of the cylinder hole is parallel to the central axis of the handlebar. Accordingly, an effective space portion can be secured around the handlebar, and layout performance is improved.

Further, since the hydraulic master cylinder is attached such that the inclination angle of the central axis of the cylinder hole with respect to the central axis of the handlebar is adjustable, the layout performance of the brake lever can be improved, and an operation position of the brake lever can be adjusted.

The brake device is attached to the handlebar via the master cylinder attachment bracket, the master cylinder attachment bracket includes the handlebar attachment portion attached to the handlebar and the master cylinder attachment portion extending downwardly of the body of the vehicle from the handlebar attachment portion, and the hydraulic master cylinder is attached to the master cylinder attachment portion. Accordingly, the clutch lever can be disposed higher in the body of the vehicle than the brake lever with a simple configuration.

Further, the hydraulic master cylinder includes the vehicle body attachment bracket attached to the master cylinder attachment bracket and elongated in the inner and outer direction of the body of the vehicle, the vehicle body attachment bracket is formed with the circular first bolt insertion hole on the inner side of the vehicle body and the second bolt insertion hole formed as the arc-shaped long hole elongated in the upper-lower direction of the body of the vehicle around the first bolt insertion hole on the outer side of the vehicle, and the hydraulic master cylinder is attached to the master cylinder attachment bracket by fastening the attachment bolt inserted into the first bolt insertion hole and the attachment bolt inserted into any position in the second bolt insertion hole to the master cylinder attachment bracket. Accordingly, the inclination angle of the central axis of the cylinder hole with respect to the central axis of the handlebar can be easily adjusted by changing a position of the attachment bolt inserted into the second bolt insertion hole.

DESCRIPTION OF EMBODIMENTS

Figure 1:
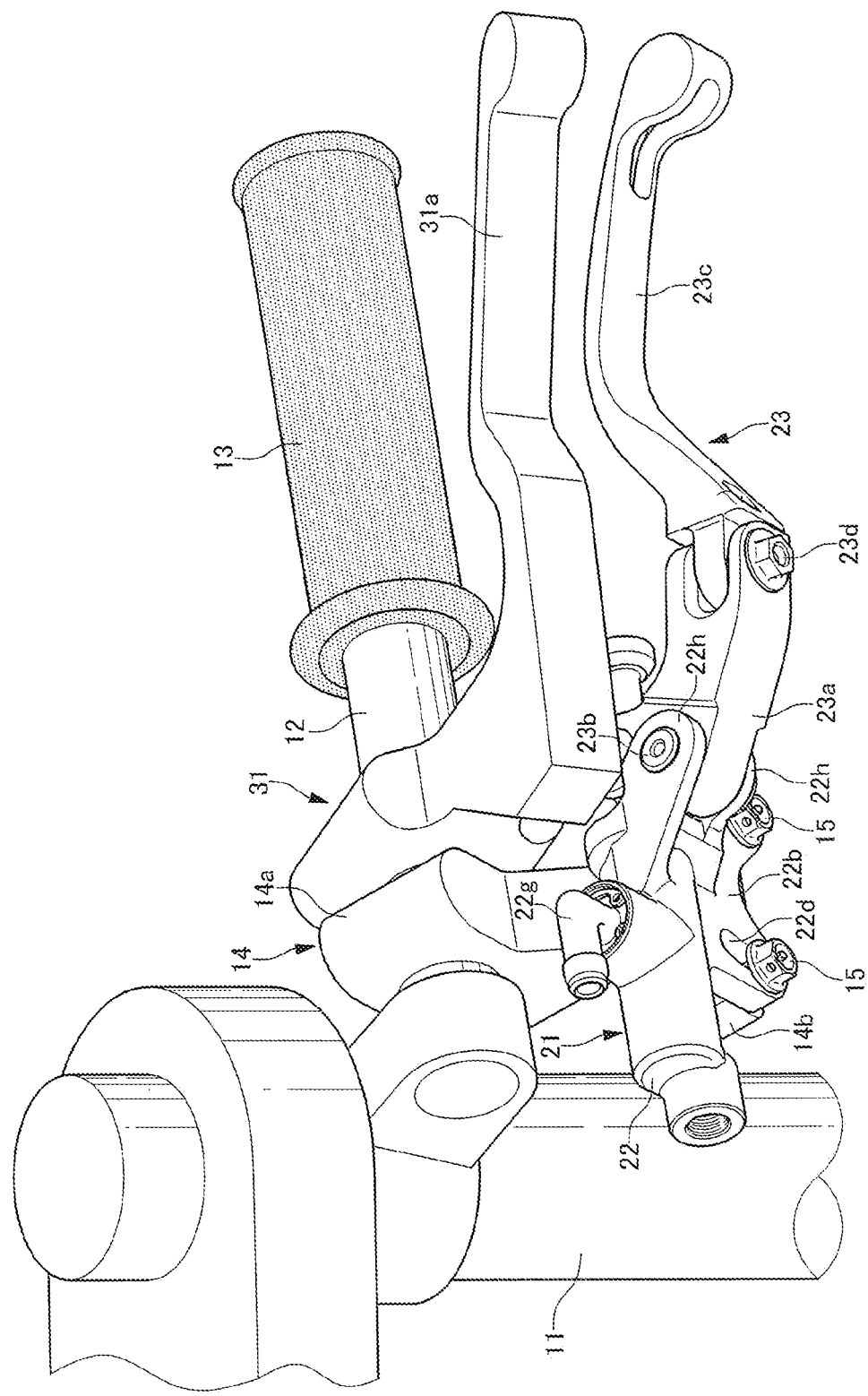
FIG. 1 is a view illustrating a front structure of a handlebar vehicle according to an embodiment of the invention.
Figure 2:
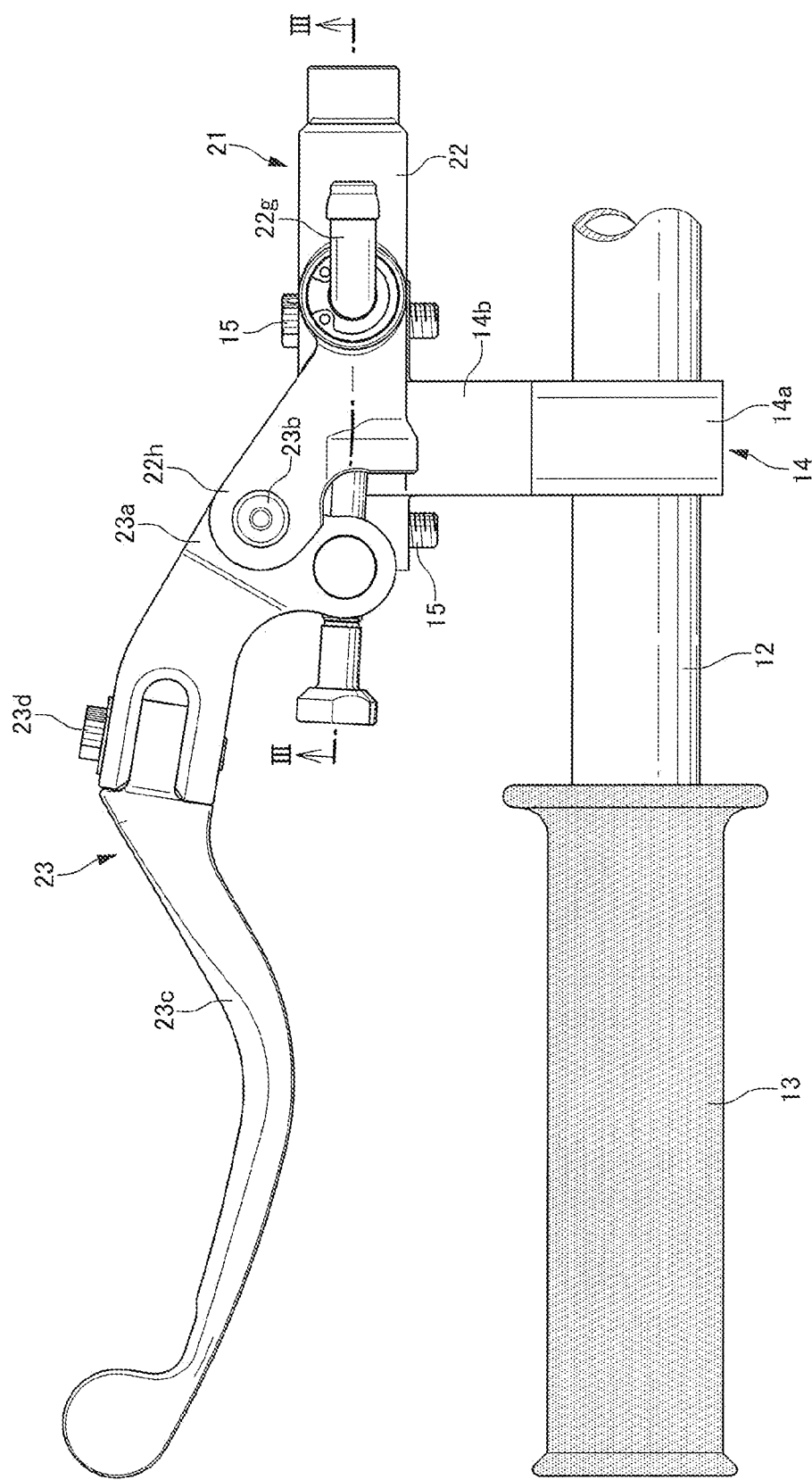
FIG. 2 is a plan view similarly illustrating an attachment state of a brake device.
Figure 3:
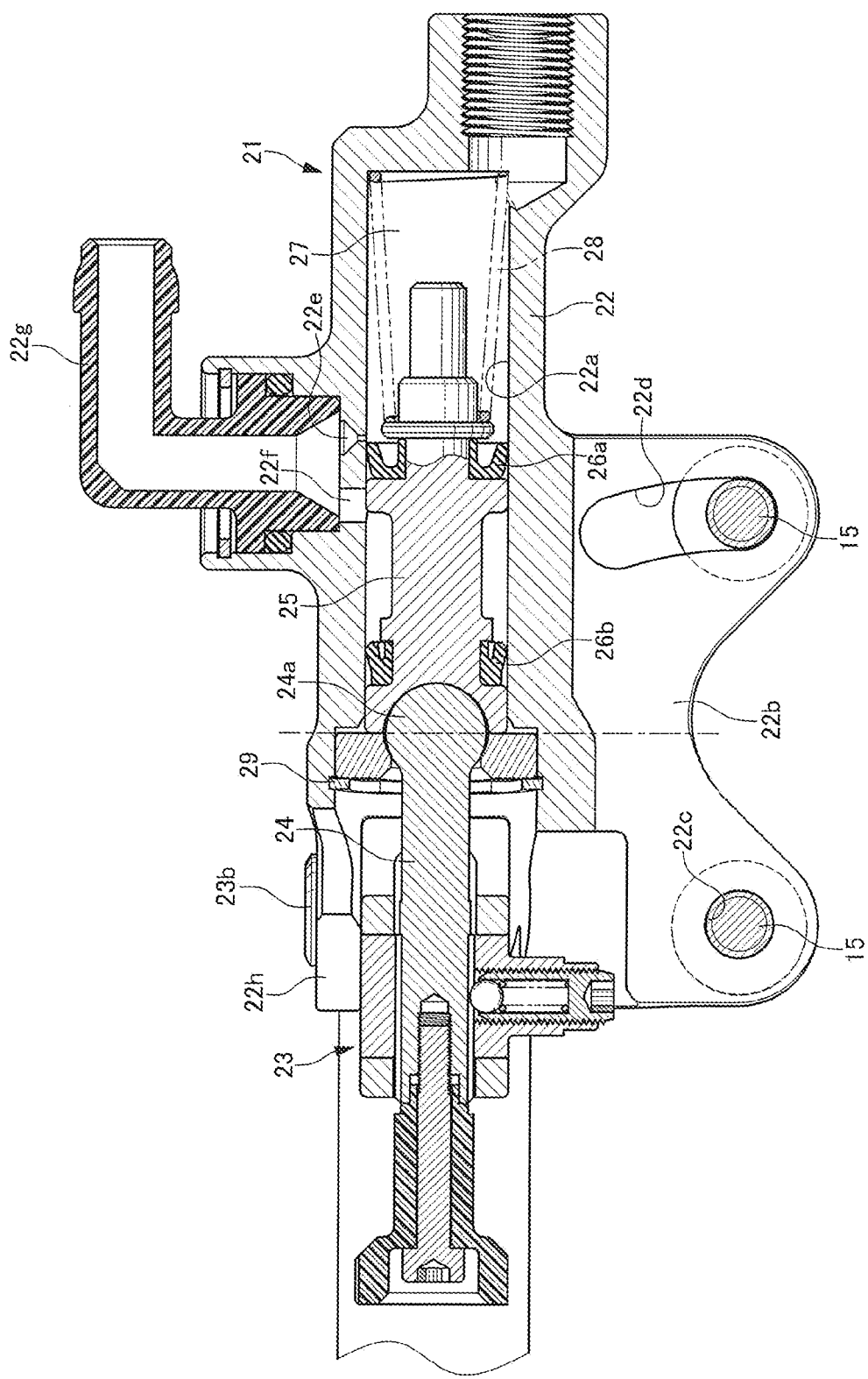
FIG. 3 is a cross-sectional view taken along a line III-III in FIG. 2.

FIGS. 1 to 6 are views illustrating a front structure of a handlebar vehicle according to an embodiment of the invention. A front fork 11 that supports a front wheel is provided at a front part of the handlebar vehicle, and steering handlebars 12 and 12 are attached to a right side and a left side of the front fork 11. Rubber grips 13 and 13 which are gripped by a rider are attached to end portions of the handlebars 12 and 12, respectively.

The handlebar on the right side is provided with a brake device (not illustrated) that supplies a hydraulic pressure to a front-wheel brake.

A master cylinder attachment bracket 14 for attaching a hydraulic master cylinder 22 of a brake device 21, which supplies the hydraulic pressure to a rear-wheel brake, to a front fork side is attached to the handlebar 12 on the left side. Further, a clutch lever 31 for pulling a wire cable connected to a clutch device that connects and disconnects a driving force transmission path between an engine and a wheel is pivotably attached to a grip 13 side of the handlebar 12 with respect to the master cylinder attachment bracket 14. In the clutch lever 31, a clutch grip operation part 31a gripped by the rider for operation extends along the grip 13 in front of the grip 13 in a body of a vehicle.

The master cylinder attachment bracket 14 includes a handlebar attachment portion 14a attached to the handlebar 12 and a master cylinder attachment portion 14b extending downwardly of the body of the vehicle from the handlebar attachment portion 14a. The master cylinder attachment portion 14b is formed with an attachment surface 14c elongated in an inner and outer direction of the body of the vehicle on a front part side of the body of the vehicle, and female screw holes 14d and 14d for fastening attachment bolts 15 and 15 are formed in parallel on the attachment surface 14c.

The brake device 21 includes the hydraulic master cylinder 22, a brake lever 23 attached to the hydraulic master cylinder 22, and a push rod 24 interposed between them. The hydraulic master cylinder 22 has a cylinder hole 22a with a bottom therein, and is provided with a vehicle body attachment bracket 22b that protrudes from a lower side wall to the lower part of the body of the vehicle and that is elongated in the inner and outer direction of the body of the vehicle. In the vehicle body attachment bracket 22b, a circular first bolt insertion hole 22c formed on an outer side of the body of the vehicle as a brake lever 23 side and a second bolt insertion hole 22d formed as an arc-shaped long hole elongated in an upper-lower direction of the body of the vehicle around the first bolt insertion hole 22c on an inner side of the body of the vehicle as the front fork 11 side are formed at positions corresponding to the female screw holes 14d and 14d, respectively.

Figure 4:
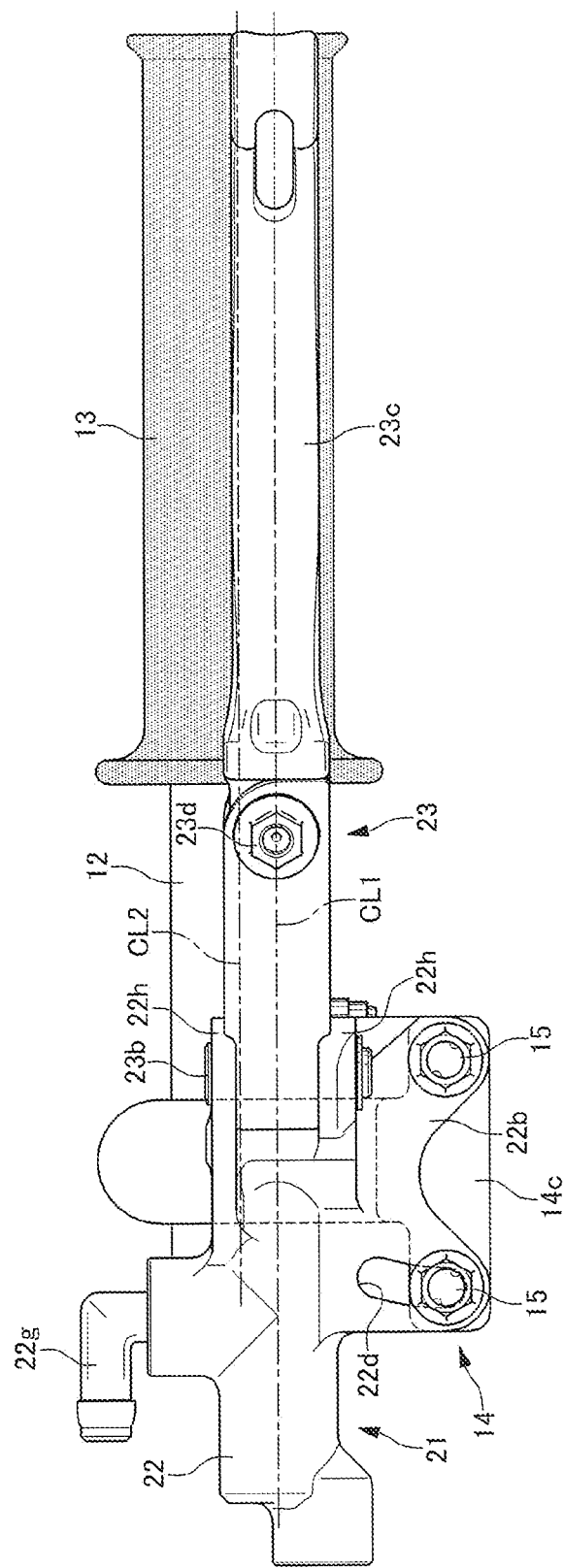
FIG. 4 is a view illustrating an attachment state of the brake device with a clutch device omitted according to the embodiment of the invention.

The hydraulic master cylinder 22 is attached to the body of the vehicle by inserting the attachment bolt 15 into the first bolt insertion hole 22c of the vehicle body attachment bracket 22b and fastening the attachment bolt 15 to the female screw hole 14d, and inserting the attachment bolt 15 into a predetermined position in the second bolt insertion hole 22d and fastening the attachment bolt 15 to the female screw hole 14d. In the present embodiment, as illustrated in FIG. 4, the hydraulic master cylinder 22 is attached such that a central axis CL1 of the cylinder hole 22a is parallel to a central axis CL2 of the handlebar 12 by inserting the attachment bolt 15 into a lower end portion of the second bolt insertion hole 22d.

Figure 5:
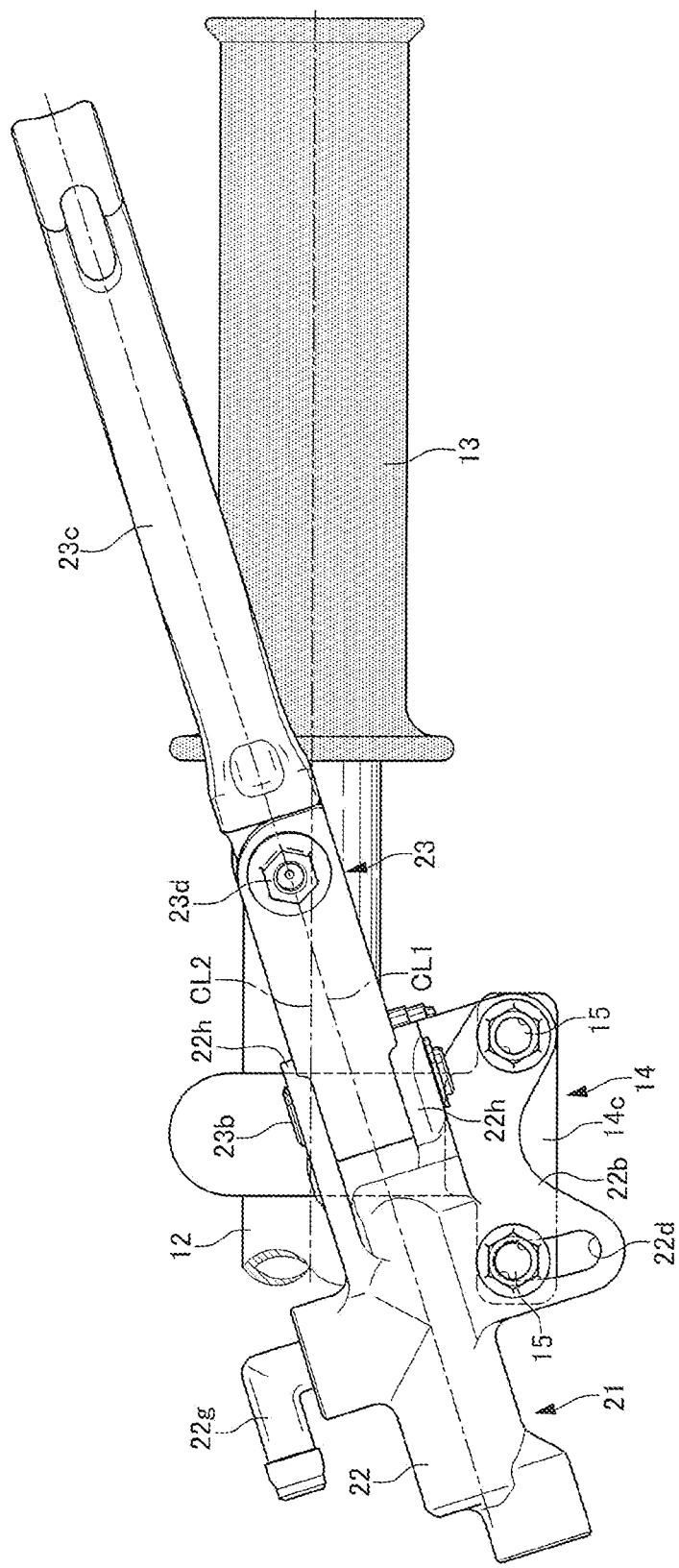
FIG. 5 is a view illustrating, with the clutch device omitted, a state in which the brake device is attached to a handlebar with a central axis of a cylinder hole inclined with respect to a central axis of the handlebar.
Figure 6:
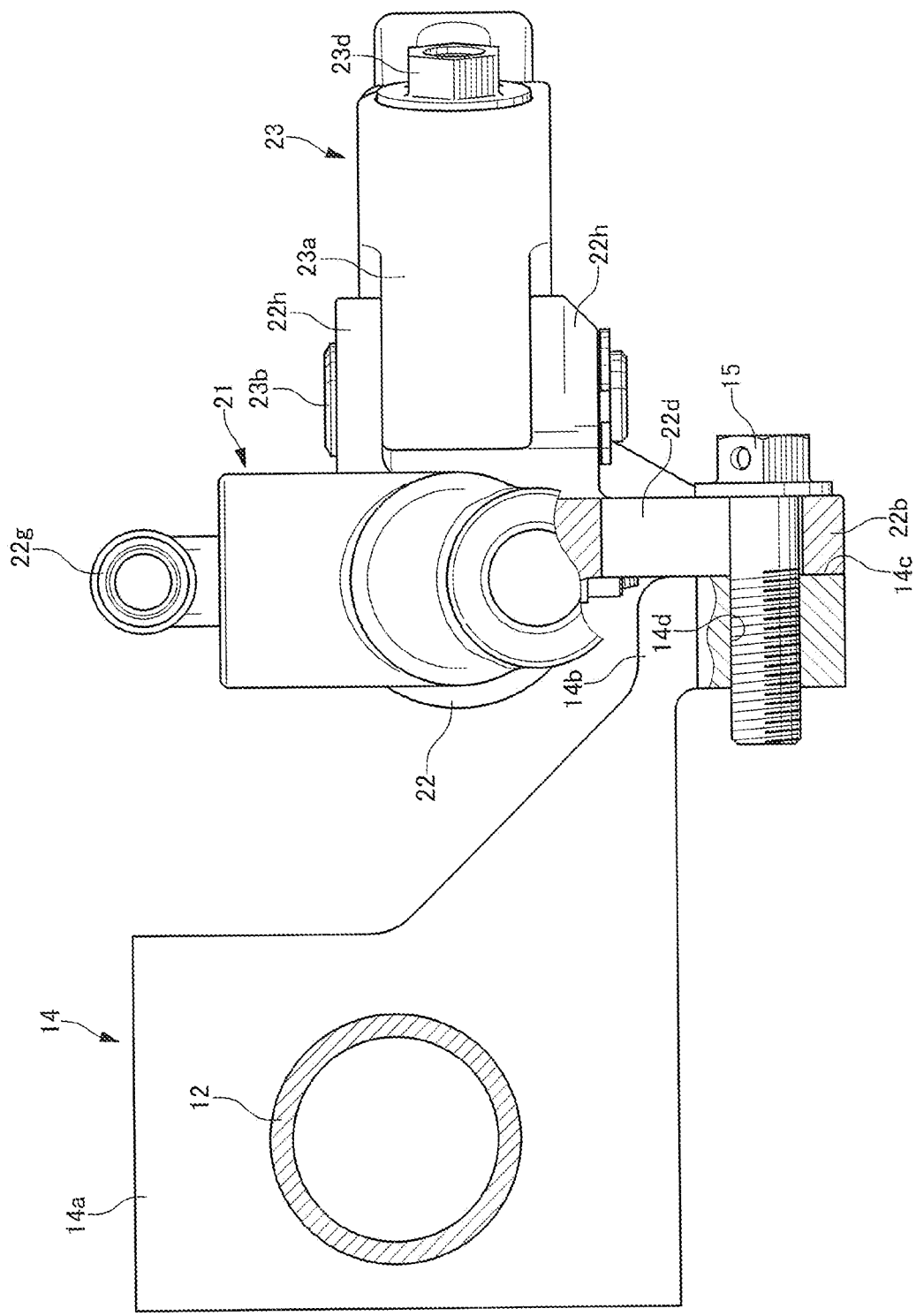
FIG. 6 is a cross-sectional view of a main part in the front structure of the handlebar vehicle according to the embodiment of the invention.

Accordingly, in the present embodiment, the hydraulic master cylinder 22 is attached such that the central axis CL1 of the cylinder hole 22a is parallel to the central axis CL2 of the handlebar. However, an inclination angle of the central axis CL1 of the cylinder hole 22a with respect to the central axis CL2 of the handlebar 12 can be adjusted by changing the position at which the attachment bolt 15 is inserted into the second bolt insertion hole 22d. For example, as illustrated in FIG. 5, when the attachment bolt 15 is inserted into an upper end portion of the second bolt insertion hole 22d, the hydraulic master cylinder 22 can be attached to the handlebar 12 in a state in which the inclination angle of the central axis CL1 of the cylinder hole 22a with respect to the central axis CL2 of the handlebar 12 is maximized.

A piston 25 is inserted into the cylinder hole 22a in a state in which a primary cup 26a and a secondary cup 26b are externally fitted to the piston 25, and a hydraulic chamber 27 is defined between the piston 25 and a bottom wall of the cylinder hole 22a. A return spring 28 is provided between the bottom wall of the cylinder hole 22a and the piston 25 in a compressed manner, the piston 25 is constantly biased in an opening direction of the cylinder hole 22a due to an elastic force of the return spring 28, a backward limit is restricted by the piston 25 being abutted against a tip end portion 24a of the push rod 24, and a ring 29 for preventing the piston 25 from falling off is attached to an opening of the cylinder hole 22a.

A relief port 22e and a supply port 22f are formed in an upper side wall of the hydraulic master cylinder 22 in a manner of communicating with the cylinder hole 22a, a connector 22g connected to a hose of a reservoir is provided for the two ports 22e and 22f, and hydraulic fluid flows between the cylinder hole 22a and the reservoir. A pair of upper and lower lever holders 22h and 22h protrude, with a predetermined gap therebetween, from an end portion of the hydraulic master cylinder 22 on an opening side of the cylinder hole, and a pivot base portion 23a of the brake lever 23 is pivotally supported by the lever holders 22h and 22h via a pivot 23b.

The brake lever 23 includes the pivot base portion 23a pivotally connected to the lever holders 22h and 22h and a brake grip operation part 23c gripped by the rider for operation, and the pivot base portion 23a and the brake grip operation part 23c are connected by a connecting bolt 23d. Since the brake lever 23 and the clutch lever 31 are pivotable in the same rotation direction, and the master cylinder attachment portion 14b, which is attached to the hydraulic master cylinder 22, of the master cylinder attachment bracket 14 further extends downwardly of the body of the vehicle, the clutch lever 31 is disposed higher in the body of the vehicle than the brake lever 23.

According to the present embodiment as described above, the rider can easily perform a clutch operation or a brake operation by gripping the clutch lever 31 or the brake lever 23 with a finger other than a thumb of a left hand while gripping the grip. Since the brake device 21 is attached to the handlebar 12 via the master cylinder attachment bracket 14, and the master cylinder attachment portion 14b, to which the hydraulic master cylinder 22 is attached, of the master cylinder attachment bracket 14 extends downwardly of the body of the vehicle, the clutch lever 31 can be disposed higher in the body of the vehicle than the brake lever 23 with a simple configuration. Further, since the central axis CL1 of the cylinder hole 22a of the hydraulic master cylinder 22 is parallel to the central axis CL2 of the handlebar 12, an effective space portion can be secured around the handlebar 12, and layout performance is improved.

Since the hydraulic master cylinder 22 can adjust the inclination angle of the central axis CL1 of the cylinder hole 22a with respect to the central axis CL2 of the handlebar 12, the layout performance of the brake lever 23 can be improved, and an operation position of the brake lever 23 can be adjusted. Further, since the inclination angle of the central axis CL1 of the cylinder hole 22a can be adjusted by changing the position at which the attachment bolt 15 is inserted into the second bolt insertion hole 22d of the vehicle body attachment bracket 22b, the inclination angle can be easily adjusted.

The invention is not limited to the configuration in which the clutch lever pulls the wire cable to activate the clutch device as in the above-described embodiment, and may have a configuration in which the clutch lever is attached to the hydraulic master cylinder and the clutch device is activated by the hydraulic pressure. Further, the hydraulic master cylinder may be attached to the handlebar in a state in which the inclination angle of the central axis CL1 of the cylinder hole cannot be adjusted.

REFERENCE SIGNS LIST 11 front fork, 12 handlebar, 13 grip, 14 master cylinder attachment bracket, 14a handlebar attachment portion, 14b master cylinder attachment portion, 14c attachment surface, 14d female screw hole, 15 attachment bolt, 21 brake device, 22 hydraulic master cylinder, 22a cylinder hole, 22b vehicle body attachment bracket, 22c first bolt insertion hole, 22d second bolt insertion hole, 22e relief port, 22f supply port, 22g connector, 22h lever holder, 23 brake lever, 23a pivot base portion, 23b pivot, 23c brake grip operation part, 23d connecting bolt, 24 push rod, 24a tip end portion, 25 piston, 26a primary cup, 26b secondary cup, 27 hydraulic chamber, 28 return spring, 29 ring, 31 clutch lever, and 31a clutch grip operation part

The invention claimed is:

1. A front structure of a handlebar vehicle in which a clutch lever configured to activate a clutch device configured to connect and disconnect a driving force transmission path to and from a wheel, and a brake lever of a brake device configured to activate a rear-wheel brake are disposed around a grip provided at a side-end part of a steering handlebar, wherein
the brake device includes a hydraulic master cylinder having a cylinder hole for accommodating a piston, and the brake lever configured to activate the piston,
the clutch lever and the brake lever extend along the grip in front of the grip in a body of the vehicle, and are pivotable in the same rotation direction, and
the clutch lever is disposed higher in the body of the vehicle than the brake lever, wherein the brake device is attached to the handlebar via a master cylinder attachment bracket, the master cylinder attachment bracket includes a handlebar attachment portion attached to the handlebar and a master cylinder attachment portion extending downwardly of the body of the vehicle from the handlebar attachment portion, and the hydraulic master cylinder is attached to the master cylinder attachment portion.

2. The front structure of a handlebar vehicle according to claim 1, wherein
the hydraulic master cylinder is attached such that a central axis of the cylinder hole is parallel to a central axis of the handlebar.

3. The front structure of a handlebar vehicle according to claim 1, wherein
the hydraulic master cylinder is attached such that an inclination angle of a central axis of the cylinder hole with respect to a central axis of the handlebar is adjustable.

4. The front structure of a handlebar vehicle according to claim 1, wherein
the hydraulic master cylinder includes a vehicle body attachment bracket attached to the master cylinder attachment bracket and elongated in an inner and outer direction of the vehicle body,
the vehicle body attachment bracket is formed with a circular first bolt insertion hole on an inner side of the body of the vehicle and a second bolt insertion hole formed as an arc-shaped long hole elongated in an upper-lower direction of the body of the vehicle around the first bolt insertion hole on an outer side of the body of the vehicle, and
the hydraulic master cylinder is attached to the master cylinder attachment bracket by fastening an attachment bolt inserted into the first bolt insertion hole and an attachment bolt inserted into any position in the second bolt insertion hole to the master cylinder attachment bracket.

* * * * *